No. 11,763. Reissued Aug. 1, 1899.
F. R. SIMMS.
EXPLOSION ENGINE OR MOTOR.
(Application filed June 13, 1899.)
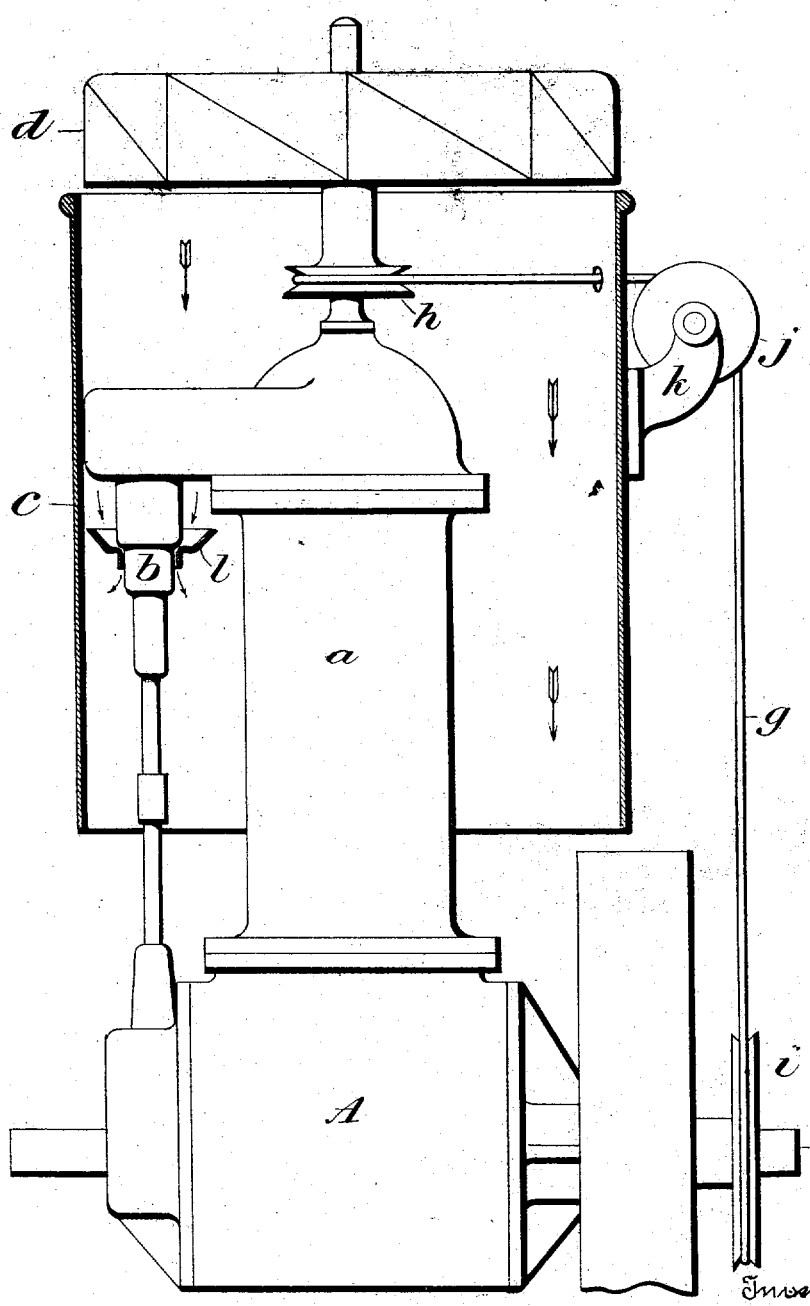
Witnesses
L. C. Hills.
L. D. Kingsbury
Inventor
Frederick R. Simms
By Whitaker & Prescott Attorneys

UNITED STATES PATENT OFFICE.

FREDERICK RICHARD SIMMS, OF LONDON, ENGLAND.

EXPLOSION ENGINE OR MOTOR.

SPECIFICATION forming part of Reissued Letters Patent No. 11,763, dated August 1, 1899.

Original No. 617,660, dated January 10, 1899. Application for reissue filed June 13, 1899. Serial No. 720,407.

*To all whom it may concern:*

Be it known that I, FREDERICK RICHARD SIMMS, a subject of the Queen of Great Britain, residing at London, England, have invented new and useful Improvements in Explosion Engines or Motors, of which the following is a specification.

This invention relates to explosion-engines; and it consists in the novel features hereinafter described, reference being had to the accompanying drawing, which illustrates one form in which I have contemplated embodying my invention, and said invention is fully disclosed in the following description and claim.

Referring to the said drawing, the figure is a sectional elevation of an explosion engine or motor embodying my invention and having a fan for cooling the cylinder and the exhaust-passage thereof.

A is the explosion engine or motor, *a* the cylinder, and *b* the exhaust thereof.

*c* is an outer sheet-metal jacket or casing inclosing the cylinder *a* and exhaust *b*, the said jacket or casing having for its object to direct the cooling-current of air, as hereinafter described.

*d* is the fan, the said fan being mounted upon a spindle *e*, arranged at the outer end of the cylinder *a*, the said fan being rotated from the crank-shaft *f* of the engine by means of a belt or cord *g*, which passes over pulleys *h* and *i* upon the spindle *e* and crank-shaft *f*, respectively.

*j* is one of a pair of guide-pulleys for the belt *g*, the said pulleys being carried in a bracket *k*, fixed to the jacket *c*.

*l* is a jacket arranged around the exhaust-passage *b*, the said jacket being formed flaring at its upper end and having for its object to cause a current of air to flow along and in contact with the said exhaust-passage.

With this construction when the engine is running the fan, which is keyed upon the spindle *e*, is rotated and drives a current of air in the direction of the arrows (indicated in Fig. 1) inside the jacket *c* and into contact with the walls of the cylinder *a* of the engine, so as to efficiently cool it, the flaring jacket *l* also directing air against the walls of the exhaust-passage *b*, as above mentioned.

Having now particularly described and ascertained the nature of my said invention and in what manner the same is to be performed, I delare that what I claim is—

In an explosive-engine, the combination with the cylinder provided with an exhaust-port, of a cylindrical main casing surrounding the cylinder and exhaust, a rotary fan mounted on the cylinder and adjacent to one end of said casing, a casing surrounding the exhaust, and having its axis disposed parallel to the axis of the main casing, and provided at the end adjacent to the fan, with a flaring collar, whereby the air from the fan will be deflected inwardly around the exhaust-port, substantially as described.

In testimony whereof I affix my signature in the presence of two witnesses.

FREDERICK RICHARD SIMMS.

Witnesses:

W. M. HARRIS,

FRED C. HARRIS.